United States Patent [19]
Anderson et al.

[11] Patent Number: 5,613,114
[45] Date of Patent: Mar. 18, 1997

[54] SYSTEM AND METHOD FOR CUSTOM CONTEXT SWITCHING

[75] Inventors: Eric W. Anderson, Los Gatos; David F. Harrison, Boulder Creek, both of Calif.

[73] Assignee: Apple Computer, Inc, Cupertino, Calif.

[21] Appl. No.: 228,140

[22] Filed: Apr. 15, 1994

[51] Int. Cl.$^6$ ................................................ G06F 9/46
[52] U.S. Cl. ............................................................. 395/678
[58] Field of Search ..................................... 395/650, 700

[56] References Cited

U.S. PATENT DOCUMENTS

| | | | |
|---|---|---|---|
| 5,179,702 | 1/1993 | Spix et al. | 395/650 |
| 5,197,138 | 3/1993 | Hobbs et al. | 395/800 |
| 5,357,617 | 10/1994 | Davis et al. | 395/800 |

*Primary Examiner*—Kevin A. Kriess
*Assistant Examiner*—John Q. Chavis
*Attorney, Agent, or Firm*—Carr, DeFilippo & Ferrell, LLP

[57] ABSTRACT

A system for custom context switching comprises a thread accounting unit, a switching routine registration unit, a thread scheduling unit, a custom context switching unit, and a default context switching unit. The thread accounting unit creates a thread object for each thread present in a multi-threaded execution environment, where the thread object includes data fields for storing a unique thread ID, a reference to a custom context switching routine, and a switching parameter signal. The switching routine registration unit stores a reference to a custom context switching routine in a particular thread object. The thread scheduling unit determines when rescheduling operations for transferring execution from one thread to another are required, and directs rescheduling operations. During rescheduling operations, the custom context switching unit initiates the execution of a custom context switching routine associated with a thread being switched-out, after which the default context switching unit performs a default context switch, after which the custom context switching unit initiates the execution of a custom context switching routine associated with a thread being switched-in. A method for custom context switching comprises the steps of: executing a thread until rescheduling is required; determining whether the thread has an associated custom context switching routine; in the event that the thread has an associated custom context switching routine, initiating the execution of the custom context switching routine; and performing a context switch.

27 Claims, 5 Drawing Sheets

| Thread ID | ~81 |
| Thread Type | ~82 |
| Thread Status | ~83 |
| Reference to Next and Previous Thread | ~84 |
| Reference to Entry Procedure | ~85 |
| Reference to Default Context Storage Location | ~86 |
| Reference to Switch-Out Routine | ~87 |
| Reference to Switch-Out Parameter Signal | ~88 |
| Reference to Switch-In Routine | ~89 |
| Reference to Switch-In Parameter Signal | ~90 |

SYSTEM AND METHOD FOR CUSTOM CONTEXT SWITCHING

BACKGROUND OF THE INVENTION

1. Field of the Invention

The present invention relates generally to systems and methods for concurrent processing, and more particularly to systems and methods for multithreaded execution. Still more particularly, the present invention is a system and method for custom context switching within a multithreaded execution environment.

2. Description of the Background Art

In a multithreaded execution environment, a thread is a set of instructions requiring execution. In such an environment, multiple threads generally require execution at any given time. Because processing resources are limited, execution is transferred from one thread to another to ensure that each thread receives some execution time and to give the appearance of continuous execution to a computer user.

A set of data that provides the most-current execution state of a particular thread is referred to as that thread's context. When execution is to be transferred from a first, currently-executing thread to a second thread, the execution of the first thread is stopped. Next, the first thread's context is saved by storing the contents of a predetermined set of registers into a set of memory locations associated with the first thread. Typically, the set of registers consists of one or more processing unit registers, and, if a floating point unit is present, one or more floating point unit registers. This same set of registers is then loaded with the contents of a set of memory locations associated with the second thread, thereby "restoring" the second thread's context. After the second thread's context has been restored, execution of the second thread can proceed. The saving of the first thread's context followed by the restoring of the second thread's context is conventionally referred to as a context switch. In the context switch, the first thread is referred to herein as being "switched-out" after its context has been saved. In an analogous manner, the second thread is referred to herein as being "switched-in" after its context has been restored.

In general, a large number of threads may be present in a multithreaded execution environment. A given thread executes for a limited amount of time, after which a conventional context switch is performed, after which another thread executes for a limited amount of time, after which a conventional context switch is performed, after which yet another thread executes for a limited amount of time, after which a conventional context switch is performed, and so on.

Any given thread may need to routinely perform one or more operations immediately before being switched-out, or immediately after being switched-in. The exact operations required may vary from one thread to another. The conventional context switch consists of an identical set of operations that are performed regardless of the particular threads involved. Thus, in the prior art, when a thread requires operations beyond those provided by the conventional context switch, program instructions for performing such operations must be included in the thread itself. This in turn increases thread complexity and thread memory storage requirements. When the additional operations required by a thread are related to the presence of particular system resources, the portability or reusability of the thread is also negatively affected.

What is needed is a means for selectively performing operations beyond those performed in the conventional context switch.

SUMMARY OF THE INVENTION

The present invention is a system and method for custom context switching. The system of the present invention comprises a custom context switching thread management unit. For each thread, the custom context switching thread management unit creates and maintains a corresponding thread object. Each thread object includes a data field wherein a unique thread identification (ID) is stored, and data fields wherein a reference to a switch-out routine, a switch-out parameter signal, a reference to a switch-in routine, and a switch-in parameter signal are selectively stored. In response to a registration request, the custom context switching thread management unit associates a switch-out routine and a switch-out parameter signal with a particular thread object, or associates a switch-in routine and a switch-in parameter signal with the particular thread object. When execution is to be transferred from a first thread to a second thread, the custom context switching thread management unit initiates the execution of the switch-out routine associated with the first thread prior to performing a conventional context switch. Via the switch-out routine, additional operations related to the first thread beyond those provided by the conventional context switch can be performed. Moreover, additional information beyond the first thread's conventional context can be saved. After the conventional context switch is performed, the custom context switching thread management unit initiates the execution of the switch-in routine, thereby providing a means for performing operations specifically associated with the second thread, and providing a means for restoring execution-state information associated with the second thread beyond that given by the conventional context associated with the second thread.

The method of the present invention comprises the steps of: executing a thread; determining whether the thread has an associated custom context switching routine; in the event that the thread has an associated custom context switching routine, executing the custom context switching routine; and performing a conventional or default context switch.

DETAILED DESCRIPTION OF THE PREFERRED EMBODIMENTS

Figure 1:
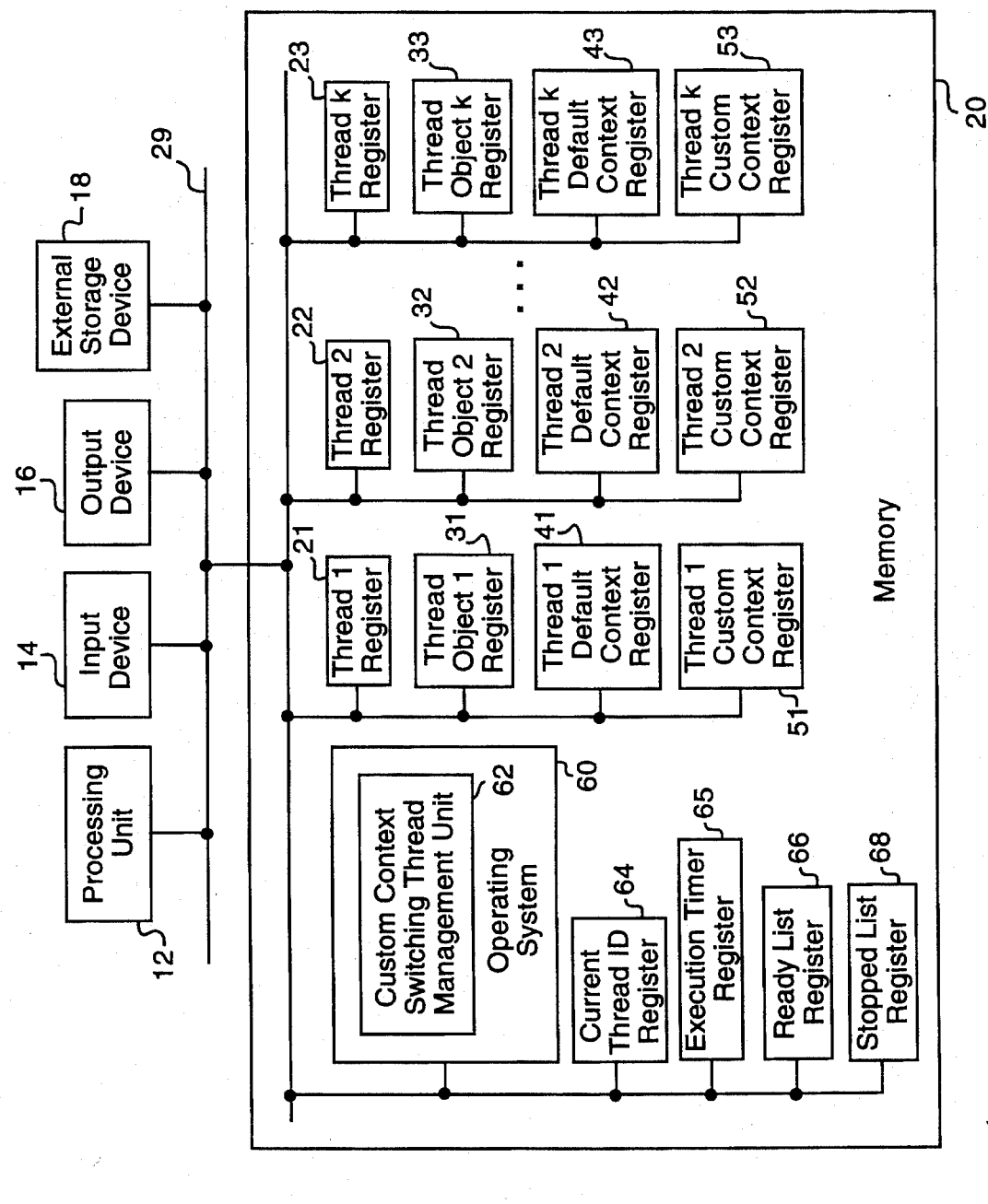
FIG. 1 is a block diagram of a preferred embodiment of a system for custom context switching constructed in accordance with the present invention.

Referring now to FIG. 1, a block diagram of a preferred embodiment of a system 10 for custom context switching constructed in accordance with the present invention is shown. The system 10 comprises a processing unit 12 having a set of registers, an input device 14, an output device 16, an external storage device 18, and a predetermined amount of memory 20 storing a first thread register 21, a first thread object register 31, a first thread default context register 41, an optional first thread custom context register 51, a second thread register 22, a second thread object register 32, a second thread default context register 42, an optional second thread custom context register 52, and so on through a kth thread register 23, a kth thread object register 33, a kth thread default context register 43, and an optional kth thread custom context register 53; an operating system 60 having a custom context switching thread management unit 62; a current thread ID register 64; an execution timer register 65; a ready list register 66; and a stopped list register 68. Each element of the system 10 is coupled to a common system bus 29. Via the custom context switching thread management unit 62, the operating system 60 provides a multithreaded execution environment. In the preferred embodiment, the operating system 60 is a set of computer program instructions. In an exemplary embodiment, the system 10 is an Apple Macintosh computer made by Apple Computer, Inc., of Cupertino, Calif., having a Motorola MC68030 central processing unit 12, a keyboard, a color graphics monitor, a 120 megabyte hard disk drive, and 8 megabytes of memory wherein a System 7 operating system 60 having the custom context switching thread management unit 62 resides.

In the present invention, a thread is a set of computer program instructions requiring execution by the processing unit 12. A given thread may itself be comprised of other threads. For example, an application program may have a main thread that includes additional threads for performing specific tasks. Each thread is preferably stored in a corresponding thread register 21, 22, 23, where each thread register 21, 22, 23 is a dynamically allocated portion of the memory 20. While FIG. 1 shows a first thread register 21 through a kth thread register 23, those skilled in the art will recognize that the number of thread registers 21, 22, 23 present in the memory 20 at any given time is limited by the size of each thread relative to the overall amount of storage provided by the memory 20. The present invention may be used to provide improved and more flexible performance even when only two threads are present and the processing unit 12 switches between executing the two threads.

As with each of the first, second, and kth thread registers 21, 22, 23, each of the first, second, and kth thread object registers 31, 32, 33; each of the first, second, and kth default context registers; each of the first, second, and kth custom context registers 51, 52, 53; the ready list register 66; and the stopped list register 68 is a dynamically allocated portion of the memory 20. Herein, a reference to the information stored in a thread register 21, 22, 23, a thread object register 31, 32, 33, a default context register 41, 42, 43, a custom context register 51, 52, 53, the current thread ID register 64, the execution timer register 65, the ready list register 66, or the stopped list register 68 is identified by the same reference number as the register itself for ease of understanding. Thus, a reference to a first thread 21 refers to the set of computer program instructions comprising a first thread that is stored within the first thread register 21. In a like manner, a reference to a second thread 22 refers to the set of computer program instructions comprising a second thread that is stored within the second thread register 22.

As can be seen from FIG. 1, a single processing unit 12 is present in the preferred embodiment of the system 10. Thus, although multiple threads will typically require execution, only one thread can be executed at any given time. To ensure that each thread receives some execution time, a currently-executing thread must voluntarily relinquish its use of the processing unit 12 at some point during its execution, or the amount of time the processing unit 12 devotes to the currently-executing thread must be automatically limited. Threads that execute until voluntarily relinquishing use of the processing unit 12 are referred to herein as cooperative threads. In the present invention, the execution of a cooperative thread can be temporarily interrupted by a preemptive thread. A preemptive thread is guaranteed to relinquish its use of the processing unit 12 after a predetermined time interval. If the predetermined time interval has not been exceeded, the preemptive thread can also voluntarily relinquish its use of the processing unit 12.

In multithreaded execution environments, rescheduling operations are performed when the use of the processing unit 12 is transferred from one thread to another. In the discussion that follows, conventional rescheduling operations are described in which the first thread 21 is taken to be the currently-executing thread. In the conventional rescheduling operations, the execution of the first thread 21 is stopped, and information specifying the first thread's current execution state is saved. This current execution state information is referred to as the first thread's context. Conventionally, the first thread's context includes the contents of a predetermined set of registers within the processing unit 12. The context conventionally associated with a given thread is referred to herein as the thread's default context, and is limited to the contents of a predetermined set of registers in the processing unit 12. Thus, the first default context 41 is saved after the execution of the first thread 21 is stopped. Those skilled in the art will recognize that the contents of other registers, such as one or more registers within a floating point unit, could also be included as a portion of the first thread's default context in an alternate embodiment. Regardless of the particular embodiment, the default context includes the contents of a predetermined set of registers, where the predetermined set of registers does not vary according to the particular thread under consideration. In the exemplary embodiment above, the default context is given by the contents of registers D0 through D7, A0 through A7, and register SR within the Motorola 68030 central processing unit 12.

In the current example, the next thread to be executed is taken to be the second thread 22. After the first default context 41 has been saved, the second default context 42 is retrieved from the memory 20 and loaded into the predetermined set of registers by the processing unit 12. This is conventionally known as restoring the second thread's context. Finally, execution of the second thread 22 is initiated. Because the second default context 42 has been restored, the processing unit 12 can continue the execution of the second thread 22 in a seamless manner, giving the appearance of uninterrupted execution to a computer user. Similarly, because the first default context 31 has been saved, the processing unit 12 will be able to continue the execution of the first thread 21 in a seamless manner when the first thread 21 regains use of the processing unit 12. Herein, the steps of 1) saving of the first default context 41; 2) selecting the second thread 22 as the next thread to be executed; and 3) restoring of the second default context 42 is known as a default context switch.

When the context of a currently-executing thread is saved, the currently-executed thread is referred to herein as being "switched-out." Similarly, when the context of a particular thread is restored in the processing unit 12, the particular thread is referred to herein as being "switched-in."

In the present invention, the custom context switching thread management unit 62 processes registration requests to selectively associate custom context switching routines with threads, and manages the transfer of execution from one thread to another. In the preferred embodiment, each custom context switching routine is stored in the memory 20. When a given thread is to be switched-out and another thread is to be switched in, the custom context switching thread management unit 62 first initiates the execution of a custom context switching routine that has been associated with the given thread. The custom context switching thread management unit 62 therefore provides a means for performing thread-specific operations associated with the thread being switched-out, and further provides a means for saving any additional information associated with the thread being switched-out beyond that provided by the thread's default context. Herein, this additional information is referred to as the thread's custom context.

After the execution of the custom context switching routine associated with the thread being switched-out has been completed, the custom context switching thread management unit 62 performs a default context switch. Additionally, the custom context switching thread management unit 62 initiates the execution of a custom context switching routine that has been associated with the thread being switched-in. In this manner, the custom context switching thread management unit 62 provides a means for performing thread-specific operations associated with the thread being switched-in, and further provides a means for restoring any custom context associated with the thread being switched-in. In the present invention, the context of each thread is given by its corresponding default context plus any associated custom context.

The custom context switching thread management unit 62 also maintains the current thread ID 64, which indicates which thread is currently executing; the execution timer 65, which indicates how long a preemptive thread has been executing; the ready list 66, which indicates one or more threads that are available to be executed; and the stopped list 68, which indicates one or more threads that are not available to be executed.

Figure 2:
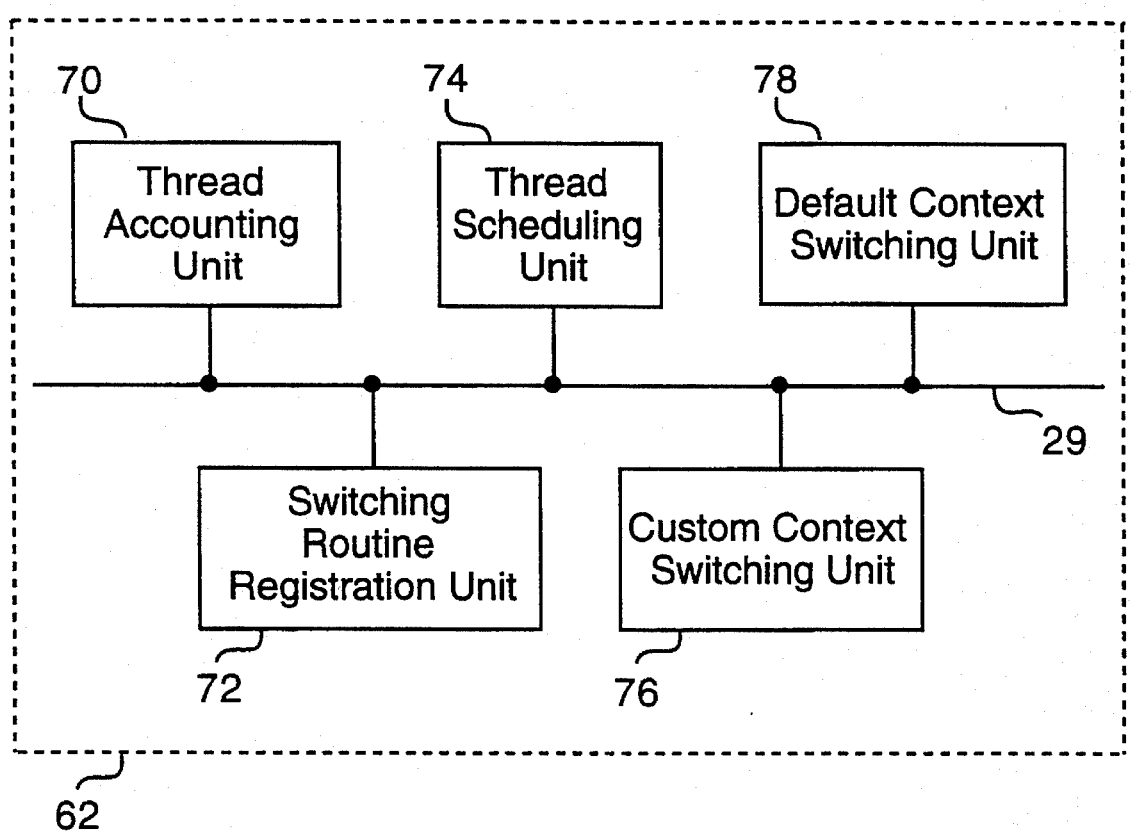
FIG. 2 is a block diagram of a preferred embodiment of a custom context switching thread management unit of the present invention.

Referring also now to FIG. 2, a block diagram of a preferred embodiment of the custom context switching thread management unit 62 is shown. The custom context switching thread management unit 62 comprises a thread accounting unit 70, a switching routine registration unit 72, a thread scheduling unit 74, a custom context switching unit 76, and a default context switching unit 78. Each element of the custom context switching thread management unit 62 is coupled to the common system bus 29.

The thread accounting unit 70 identifies a set of instructions as a thread in response to a thread creation request. In the preferred embodiment, thread creation requests can be issued by threads themselves. Preferably, the thread creation request specifies a thread type, a pointer to a thread entry procedure, an initial thread status, and an address at which a unique thread ID can be stored. In the preferred embodiment, the thread type indicates whether the thread is to function as a cooperative thread or as a preemptive thread. The pointer to the thread entry procedure specifies an address at which a first instruction to be executed within the thread is located. The initial thread status specifies either that the thread is to be initially assigned a "ready" status, or that the thread is to be initially assigned a "stopped" status. The ready status indicates that the thread is available to be executed, while the stopped status indicates that the thread is not available to be executed.

Figure 3:
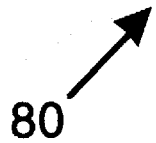
FIG. 3 is a block diagram of a preferred embodiment of a thread data structure in the present invention.

In response to a thread creation request, the thread accounting unit 70 generates a unique thread ID, and allocates a portion of the memory 20 for storing the default context associated with the thread. In the preferred embodiment, memory allocation and deallocation services are provided by the operating system 60. After allocating a portion of the memory 20 for storing the default context associated with the thread, the thread accounting unit 70 creates a corresponding thread object 80. Referring now to FIG. 3, a block diagram of a preferred embodiment of a thread object 80 is shown. The thread object 80 includes a first data field 81 for storing the thread ID; a second data field 82 for storing the thread type specified in the thread creation request; a third data field 83 for storing the initial thread status specified in the thread creation request; a fourth data field 84 for storing a pointer to a next thread object and a pointer to a previous thread object; a fifth data field 85 for storing the pointer to the entry procedure; a sixth data field 86 for storing a pointer to a corresponding default context register; a seventh data field 87 for storing a pointer to a switch-out routine; an eighth data field 88 for storing a switch-out parameter signal; a ninth data field 89 for storing a pointer to a switch-in routine; and a tenth data field 90 for storing a switch-in parameter signal. In the preferred embodiment, the thread accounting unit 70 initially stores a "nil" value in each of the seventh through tenth data fields 87, 88, 89, 90. The first, second, and kth thread objects 31, 32, 33 in FIG. 1 each have a corresponding thread object 80 with the structure shown in FIG. 3.

In the preferred embodiment of the present invention, the thread ID is a 32-bit number that can be decoded to provide the location of the corresponding thread object 80. The decoding is facilitated through a conventional object ID decoding service provided by the operating system 60. Those skilled in the art will recognize that in an alternate embodiment, the thread ID could directly specify the location of the thread object 80.

Following the creation of the thread object 80, the thread accounting unit 70 inserts a reference to the thread object 80 into the ready list 66 or the stopped list 68, depending upon whether the initial thread status is the ready status or the stopped status, respectively. In the preferred embodiment, the ready list 66 is a linked list maintained in first-in, first-out (FIFO) order that contains a copy of the thread ID of each thread that has been assigned the ready status. The stopped list 68 is preferably a linked list that contains a copy of the thread ID of each thread that has been assigned the stopped status. After inserting a reference to the thread object 80 into the ready list 66 or the stopped list 68, the thread accounting unit 70 stores pointers to the next and previous thread objects 80 within the ready list 66 or the stopped list 68, respectively, in the thread object's fourth data field 84. Finally, the thread accounting unit 70 stores the thread ID generated at the address specified in the thread creation request.

In response to a currently-executing thread's issuance of a set-status request that specifies a thread ID and a given thread status, the thread accounting unit 70 decodes the thread ID to determine the location of the corresponding thread object 80. After determining the location of the corresponding thread object 80, the thread accounting unit 70 determines whether the thread status specified in the set-status request is different from that specified in the determined thread object's third data field 87. If there is no difference, the thread accounting unit 70 does not consider the set-status request further. If the thread status specified in the set-status request differs from that stored in the determined thread object 80, the thread accounting unit 70 searches the ready list 66 or the stopped list 68 in accordance with the thread status stored in the determined thread object's third data field 87, and removes the reference to the determined thread object 80 from the ready list 66 or the stopped list 68, respectively. The thread accounting unit 70 then stores the thread status specified in the set-status request in the determined thread object's third data field 87. In the event that the newly-stored thread status is the ready status, the thread accounting unit 70 inserts a reference to the determined thread object 80 in the ready list 66, and updates the pointers in the determined thread object's fourth data field 87 indicating the next and preceding thread objects in the ready list 66. In the event that the newly-stored thread status is the stopped status, the thread accounting unit 70 inserts a reference to the determined thread object 80 in the stopped list 68, and updates the pointers in the determined thread object's fourth data field 87 indicating the next and preceding thread objects in the stopped list 68.

In response to a thread deletion request that specifies a thread ID, the thread accounting unit 70 removes the thread ID from the ready list 66 or the stopped list 68, deletes the corresponding thread object 80, and deallocates the portion of the memory 20 used to store the thread's default context. In the preferred embodiment, thread deletion requests can be issued by the currently-executing thread.

The switching routine registration unit 72 associates a custom context switching routine and a corresponding switching parameter signal with a given thread in response to a registration request. In the preferred embodiment, the custom context switching routine performs a particular set of operations according to the value of the switching parameter signal. Preferably, the registration request specifies a thread ID corresponding to a particular thread, a reference to a custom context switching routine, a switching parameter signal, and a switching routine categorization. The switching routine categorization preferably indicates whether the custom context switching routine is to be executed before the particular thread is switched-out, or after the particular thread is switched-in. If the custom context switching routine is to be executed when the thread is switched-out, it is referred to herein as a switch-out routine for the thread, and the corresponding switching parameter signal is referred to herein as a switch-out parameter signal. In a like manner, if the custom context switching routine is to be executed when the thread is switched-in, it is referred to herein as a switch-in routine for the thread, and the switching parameter signal is referred to herein as a switch-in parameter signal. Preferably, the switching routine categorization is a Boolean signal.

In response to the registration request, the switching routine registration unit 72 decodes the specified thread ID to determine the location of the corresponding thread object 80. The switching routine registration unit 72 then examines the switching routine categorization within the thread object 80. If the switching routine categorization indicates that the custom context switching routine is a switch-out routine for the particular thread, the switching routine registration unit 72 stores the pointer to the switch-out routine and the switch-out parameter signal in the seventh and eighth data fields 87, 88, respectively, of the thread object 80. If the switching routine categorization indicates that the custom context switching routine is a switch-in routine, the switching routine registration unit 72 stores the pointer to the switch-in routine and the switch-in parameter signal in the ninth and tenth data fields 89, 90, respectively, of the thread object 80.

In the preferred embodiment, modification of the pointer to the custom context switching routine or the corresponding switching parameter signal is itself accomplished through a registration request. Those skilled in the art will recognize that a separate modification request could be supported in an alternate embodiment.

The thread scheduling unit 74 selects a thread for execution, and initiates the execution of the selected thread. As will be described in detail below, prior to initiating the execution of the selected thread, the thread scheduling unit 74 stores the corresponding thread ID as the current thread ID 64 at a predetermined location in memory. If the selected thread is a preemptive thread, the thread scheduling unit 74 additionally maintains the execution timer 65 to indicate whether a predetermined execution time has been exceeded. After initiating the execution of the selected thread, the thread scheduling unit 74 determines whether the selected thread is to be rescheduled, that is, whether the execution of the selected thread is to be stopped and the execution of another thread is to begin. In the preferred embodiment, the thread scheduling unit 74 determines that the selected thread is to be rescheduled in the event that 1) the selected thread issues a yield request, thereby voluntarily relinquishing its use of the processing unit 12; or 2) the predetermined execution time is exceeded in the event that the selected thread is a preemptive thread. Those skilled in the art will recognize that rescheduling could occur in response to other events in an alternate embodiment of the present invention.

When a currently-executing thread is to be rescheduled, the thread scheduling unit 74 directs rescheduling operations. The rescheduling operations performed in an exemplary rescheduling are now considered. In the exemplary rescheduling, the first thread 21 is initially defined as the currently-executing thread, and the thread ID of the second thread 22 is taken to be at the top of the ready list 66; thus, the second thread 22 is the next thread to be executed. As shown in FIG. 1, the first default context 41 is the default context associated with the first thread 21, and the first custom context 51 is the custom context associated with the first thread 21. In a like manner, the second default context 42 and the second custom context 52 are the default context and the custom context, respectively, associated with the second thread 22.

In response to a yield request issued by the first thread 21 during its execution, the thread scheduling unit 74 issues a stop execution signal to the processing unit 12, thereby stopping the execution of the first thread 21. When the first thread 21 is a preemptive thread, the thread scheduling unit 74 also monitors the execution timer 65. If the predetermined execution time is exceeded during the first thread's execution, the thread scheduling unit 74 issues the stop execution signal. After stopping the first thread's execution, the thread scheduling unit 74 issues a switch-out custom context signal to the custom context switching unit 76 to initiate the saving of the first custom context 51.

In response to a first completion signal issued by the custom context switching unit 76, the thread scheduling unit 74 retrieves the current thread ID 64, and stores the current thread ID at the end of the ready list 66. In this manner, the thread scheduling unit 74 ensures that the first thread 21 can be selected for execution at a later time. The thread scheduling unit 74 subsequently selects the second thread 22 as the next thread to be executed by retrieving the thread ID associated with the second thread 22 from the top of the ready list 66, storing the thread ID associated with the second thread 22 as the current thread ID 64, and deleting the thread ID associated with the second thread 22 from the top of the ready list 66.

After selecting the second thread 22 for execution, the thread scheduling unit 74 issues a default switching signal to the default context switching unit 78 to initiate a default context switch. As will be described below, the default context switching unit 78 issues a default switch completion signal upon completion of the default context switch. In response to the default switch completion signal, the thread scheduling unit 74 issues a switch-in custom context signal to the custom context switching unit 76 to restore the second custom context 52. After receiving a second completion signal from the custom context switching unit 76, the thread scheduling unit 74 issues a begin execution signal to the processing unit 12 to begin the execution of the second thread 22. The thread scheduling unit 74 also initializes and starts the execution timer 65 if the thread type within the second thread object 32 indicates that the second thread 22 is a preemptive thread.

The custom context switching unit 76 initiates the execution of a switch-out routine or a switch-in routine in the event that a switch-out routine or a switch-in routine, respectively, has been associated with a thread. In the preferred embodiment, the custom context switching unit 76 responds to the switch-out custom context signal or the switch-in custom context signal. In response to the switch-out custom context signal, the custom context switching unit 76 retrieves the current thread ID 64, and decodes the current thread ID 64 to determine the location of the first thread object 31. The custom context switching unit 76 then examines the seventh data field 87 in the first thread object 31 to determine whether the first thread object 31 has an associated switch-out routine. If the seventh data field 87 contains a reference to a switch-out routine, the custom context switching unit 76 initiates the execution of the switch-out routine through a function call that passes the switch-out parameter signal stored in the thread object's eighth data field 58 to the switch-out routine. After the switch-out routine has completed its operations, or if the seventh data field 87 contains a nil value rather than a reference to a switch-out routine, the custom context switching unit 76 issues the first completion signal to the thread scheduling unit 74.

In response to the switch-in custom context signal, the custom context switching unit 76 retrieves the current thread ID 64, decodes the current thread ID 64 to determine the location of the second thread object 32, and examines the thread object's ninth data field 89 to determine whether the second thread object 32 has an associated switch-in routine. If the second thread object 32 has an associated switch-in routine, the custom context switching unit 76 initiates the execution of the switch-in routine in a manner analogous to that described above for the switch-out routine, passing the switch-in parameter signal to the switch-in routine. After the switch-in routine has completed its operations, or if the second thread object 32 does not have an associated switch-in routine, the custom context switching unit 76 issues the second completion signal to the thread scheduling unit 74.

The default context switching unit 78 performs a default context switch-in response to the default switching signal. In the default context switch, the default context switching unit 78 retrieves and decodes the thread ID stored at the end of the ready list 66, which in the case currently considered is the thread ID associated with the first thread 21. The default context switching unit 78 then retrieves the reference to the location at which the first default context 41 is stored from the sixth data field 86 within the first thread object 31. Next, the default context switching unit 78 stores the contents of the predetermined set of registers within the processing unit 12 as the first default context 41 at the location referenced in the first thread object 31. The default context switching unit 78 subsequently retrieves and decodes the current thread ID 64, and obtains the location at which the second default context 42 is stored from the second thread object's sixth data field 86. The default context switching unit 78 then loads the second default context 42 into the predetermined set of registers, thereby restoring the second default context 42. After restoring the second default context 42, the default context switching unit 78 issues the default switch completion signal.

Figure 4:
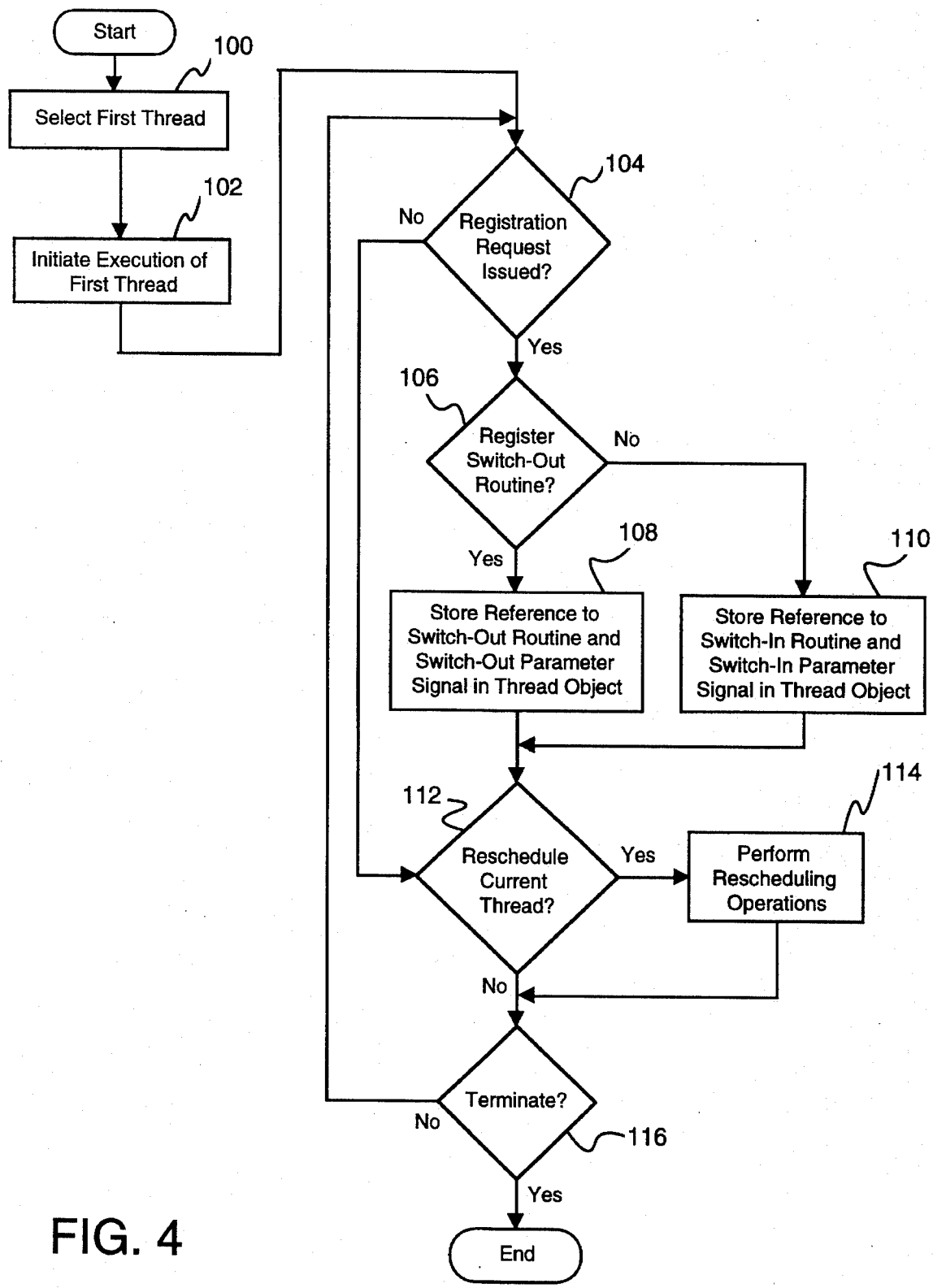
FIG. 4 is a flowchart of a preferred method for custom context switching in accordance with the present invention.

Referring now to FIG. 4, a flowchart of a preferred method for custom context switching is shown. The preferred method begins in step 100 with the thread scheduling unit 74 selecting a first thread to be executed, after which the thread scheduling unit 74 initiates the execution of the first thread in step 102, thereby making the first thread the currently-executing thread. Next, the switching routine registration unit 72 determines whether the currently-executing thread has issued a registration request in step 104. If so, the switching routine registration unit 72 determines in step 106 whether a switch-out routine is to be registered by examining the switching routine categorization specified in the registration request. If a switch-out routine is to be registered, the switching routine registration unit 72 stores the reference to the switch-out routine and the switch-out parameter signal specified in the registration request in the seventh and eighth data fields 87, 88 of the thread object 80 corresponding to the thread ID specified in the registration request in step 108. If a switch-in routine is to be registered, the switching routine registration unit 72 stores the reference to the switch-in routine and the corresponding switch-in parameter signal in the ninth and tenth data fields 89, 90 of the thread object 80 corresponding to the thread ID specified in the registration request in step 110.

If the switching routine registration unit 72 determines in step 104 that no registration request has been issued, or after either of steps 108 or 110, the thread scheduling unit 74 determines whether the currently-executing thread is to be rescheduled in step 112. The thread scheduling unit 74 preferably performs step 112 by determining whether the predetermined execution time has been exceeded in the event that the currently-executing thread is a preemptive thread, or by determining whether the currently-executing thread has issued a yield request. If the currently-executing thread is to be rescheduled, the thread scheduling unit 74, the custom context switching unit 76, and the default context switching unit 78 perform rescheduling operations in step 114. If the currently-executing thread is not to be rescheduled at this point in time, the thread scheduling unit 74 determines in step 116 whether operation is to continue. If so, the preferred method returns to step 104. If operation is not to continue, the preferred method ends.

Figure 5:
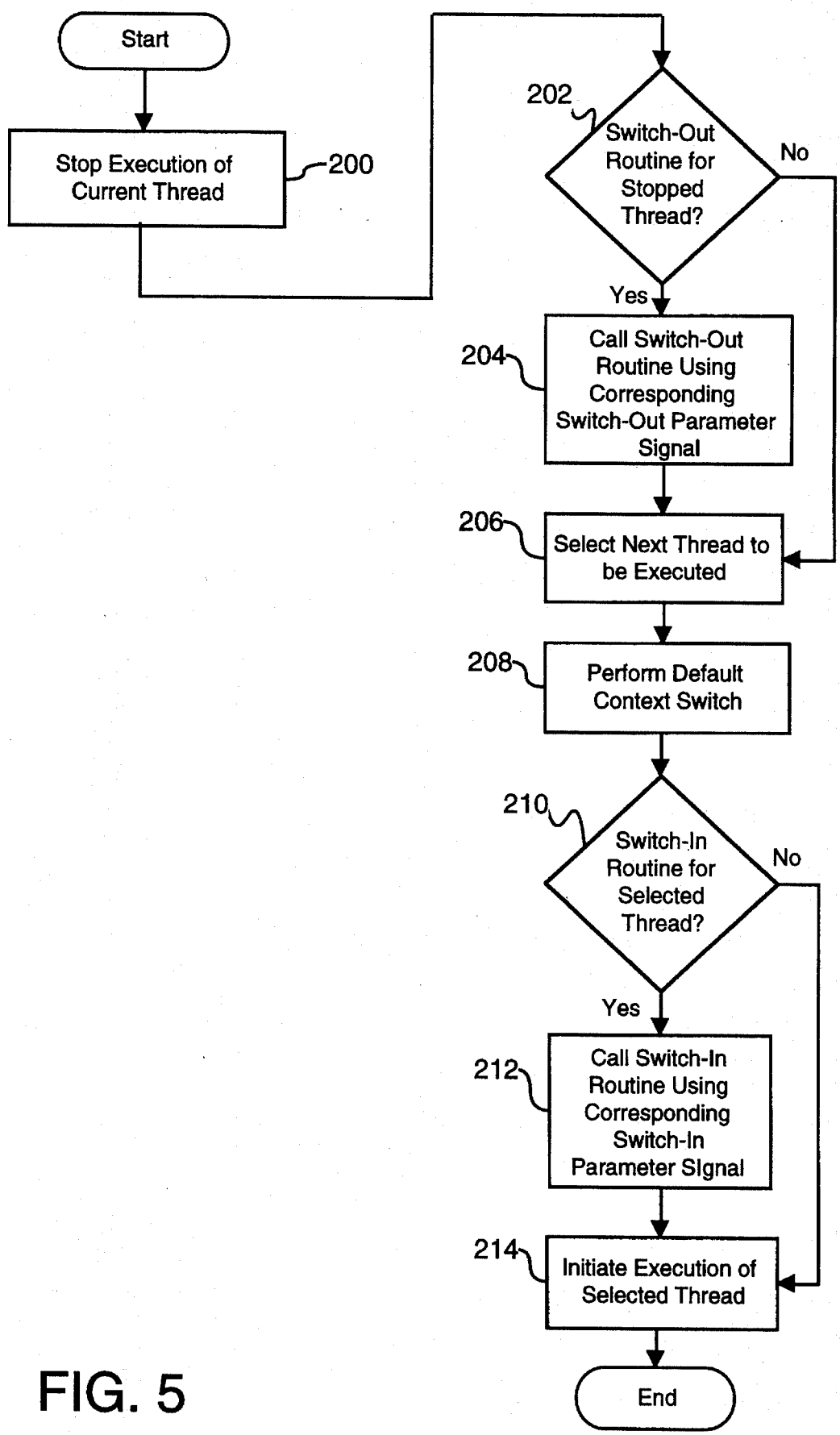
FIG. 5 is a flowchart of a preferred method for performing rescheduling operations in accordance with the present invention.

Referring now to FIG. 5, a flowchart of a preferred method for performing rescheduling operations (step 114 of FIG. 4) is shown. The preferred method begins in step 200 with the thread scheduling unit 74 issuing the stop execution signal to the processing unit 12 to stop the execution of the currently-executing thread. Next, in step 202, the custom context switching unit 76 determines whether the seventh data field 87 in the thread object 80 corresponding to the current thread ID 64 contains a reference to a switch-out routine. If so, the custom context switching unit 76 calls the switch-out routine using the switch-out parameter signal stored in the thread object's eighth data field 88 in step 204. The performance of step 204 saves the custom context corresponding to the thread associated with the current thread ID 64. After step 204, or after step 202, the thread scheduling unit 74 selects the next thread to be executed in step 206. In step 206, the thread scheduling unit 74 stores the current thread ID 64 at the end of the ready list. The thread scheduling unit 74 then stores the thread ID at the top of the ready list 66 as the current thread ID 64, and subsequently removes the thread ID from the top of the ready list 66. Following step 206, the default context switching unit 78 performs a default context switch in step 208.

After step 208, the custom context switching unit 76 determines whether a reference to a switch-in routine is present in the ninth data field 89 of thread object 80 corresponding to the current thread ID 64 in step 210. If so, the custom context switching unit 76 calls the switch-in routine using the switch-in parameter signal stored in the thread object's tenth data field 90 in step 212. The performance of step 212 restores the custom context associated with the selected thread. After step 212, or after step 210, the thread scheduling unit 74 begins the execution of the selected thread by issuing the begin execution signal to the processing unit 12 in step 214, after which the preferred method ends.

The present invention selectively associates a switch-out routine, a switch-out parameter signal, a switch-in routine, and a switch-in parameter signal, any of which may be unique, with a given thread. In the event that the given thread has an associated switch-out routine and is to be switched out, the present invention executes the switch-out routine according to the value of the corresponding switch-out parameter signal prior to performing a default context switch in which the given thread's default context is switched-out. In the event that the given thread has an associated switch-in routine and is to be switched in, the present invention executes the switch-in routine according to the value of the switch-in parameter signal following the performance of a default context switch in which the given thread's default context has been switched in. The present invention therefore provides a flexible means for saving and restoring and any custom context associated with the given thread.

While the present invention has been described with reference to a preferred embodiment, those skilled in the art will recognize that various modifications may be provided. For example, multiple switch-out or switch-in routines could be "chained together" via a linked list stored within the thread object's seventh or ninth data field 87, 89, respectively. Each switch-out or switch-in routine in the chain would be called and thereby executed when the associated thread is switched-out or switched-in, respectively. As another example, in addition to the custom context associated with any given thread, a custom system context could be saved and restored depending upon the particular processing unit 12 and other system resources present. These and other variations upon and modifications to the preferred embodiments are provided for by the present invention, which is limited only by the following claims.

What is claimed is:

1. In a computer system having a processing unit and a memory having an operating system providing a multi-threaded execution environment, a method for custom context switching, comprising the steps of:

executing a thread;

determining whether the thread has a switch-out routine for performing thread-dependent context switching operations, the switch-out routine comprising program instructions stored external to the thread;

executing the switch-out routine, if the switch-out routine exists; and performing a default context switch, wherein the default context switch performs a predetermined set of thread-independent context switching operations, the default context switch comprising program instructions stored external to the thread.

2. The method of claim 1, further comprising the step of associating the switch-out routine with the thread.

3. The method of claim 1, further comprising the step of associating a switch-out parameter signal with the thread, wherein the switch-out parameter signal corresponds to a particular set of actions to be performed by the switch-out routine.

4. The method of claim 3, further comprising the step of transferring the switch-out parameter signal to the switch-out routine.

5. In a computer system having a processing unit and a memory having an operating system providing a multi-threaded execution environment, a method for custom context switching, comprising the steps of:

selecting a thread to be executed;

performing a default context switch, wherein the default context switch performs a predetermined set of thread-independent context switching operations, the default context switch comprising program instructions stored external to the thread;

determining whether the thread has a switch-in routine for performing thread-dependent context switching operations, the switch-in routine comprising program instructions stored external to the thread;

executing the switch-in routine, if the switch-in routine exists; and executing the thread.

6. The method of claim 5, wherein the step of performing a default context switch is performed after the step of executing the switch-in routine.

7. The method of claim 5, further comprising the step of associating the switch-in routine with the thread.

8. The method of claim 5, further comprising the step of associating a switch-in parameter signal with the thread, wherein the switch-in parameter signal corresponds to a particular set of actions to be performed by the switch-in routine.

9. The method of claim 1, further comprising the step of creating a thread object having a first data field for storing a thread identification and a second data field for storing a reference to a switch-out routine.

10. The method of claim 9, wherein the thread object includes a third data field for storing a reference to a switch-out parameter signal.

11. A system for customizable context switching comprising:

a means for executing a thread;

a means for determining whether the thread has a switch-out routine for performing thread-dependent context switching operations, the switch-out routine comprising program instructions stored external to the thread;

a means for executing the switch-out routine; and a means for performing a default context switch, wherein the default context switch performs a predetermined set of thread-independent context switching operations, the default context switch comprising program instructions stored external to the thread.

12. The system of claim 11, further comprising a means for associating a switch-out parameter signal with the thread, the switch-out parameter signal used to selectively determine the actions performed by the switch-out routine.

13. In a computer system having a processing unit and a memory having an operating system providing a multithreaded execution environment, a system for custom context switching, comprising a:

means for selecting a thread to be executed;

means for performing a default context switch, wherein the default context switch performs a predetermined set of thread-independent context switching operations, the default context switch comprising program instructions stored external to the thread;

means for determining whether the thread has a switch-in routine for performing thread-dependent context switching operations, the switch-in routine comprising program instructions stored external to the thread;

means for executing the switch-in routine, if the switch-in routine exists; and means for executing the thread.

14. The system of claim 13, further comprising a means for associating a switch-in parameter signal with the thread, the switch-in parameter signal used to selectively determine the actions performed by the switch-in routine.

15. A system for customizable context switching comprising:

a memory having an operating system comprising program instructions for providing a multithreaded execution environment, a custom context switching unit comprising program instructions for initiating execution of a custom context switching routine associated with and stored external to a thread and performing thread-dependent context switching operations, a default context switching unit comprising program instructions for initiating execution of a default switching routine stored external to the thread and performing a predetermined set of thread-independent context switching operations; and a processing unit, for executing program instructions, coupled to the operating system, the custom context switching unit, and the default context switching unit within the memory.

16. The system of claim 15, wherein the custom context switching routine comprises a switch-out routine and a switch-out parameter signal.

17. The system of claim 15, wherein the memory further comprises a thread scheduling unit comprising program instructions for determining whether a thread is to be rescheduled and for performing thread rescheduling operations, the thread scheduling unit coupled to the processing unit.

18. The system of claim 15, wherein the memory further comprises a switching routine registration unit comprising program instructions for associating a custom context switching routine with a thread, the switching routine registration unit coupled to the processing unit.

19. The system of claim 15, wherein the memory further comprises a thread accounting unit comprising program instructions for creating a thread object corresponding to a thread, the thread accounting unit coupled to the processing unit.

20. The system of claim 19, wherein the thread object comprises a first data field for storing a thread identification and a second data field for storing a reference to the custom context switching routine.

21. The system of claim 20, wherein the thread object comprises a third data field for storing a switching parameter signal.

22. The method of claim 1, wherein the step of performing a default context switch is performed before the step of executing the switch-out routine.

23. The system of claim 15, wherein the custom context switching routine comprises a switch-in routine and a switch-in parameter signal.

24. A computer readable medium comprising program instructions for:

executing a thread;

determining whether the thread has a switch-out routine for performing thread-dependent context switching operations, the switch-out routine comprising program instructions stored external to the thread;

executing the switch-out routine, if the switch-out routine exists; and performing a default context switch, wherein the default context switch performs a predetermined set of thread-independent context switching operations, the default context switch comprising program instructions stored external to the thread.

25. The computer readable medium of claim 24, further comprising program instructions for associating a switch-out parameter signal with the thread, wherein the switch-out parameter signal corresponds to a particular set of actions to be performed by the switch-out routine.

26. A computer readable medium comprising program instructions for:

selecting a thread to be executed;

performing a default context switch, wherein the default context switch performs a predetermined set of thread-independent context switching operations, the default context switch comprising program instructions stored external to the thread;

determining whether the thread has a switch-in routine for performing thread-dependent context switching operations, the switch-in routine comprising program instructions stored external to the thread;

executing the switch-in routine, if the switch-in routine exists; and executing the thread.

27. The computer readable medium of claim 26, further comprising program instructions for associating a switch-in parameter signal with the thread, wherein the switch-in parameter signal corresponds to a particular set of actions to be performed by the switch-in routine.

* * * * *